United States Patent
Schwander et al.

[11] 3,857,864
[45] Dec. 31, 1974

[54] ANTHRAQUINONE COMPOUNDS

[75] Inventors: Hansrudolf Schwander, Riehen; Arthur Buhler, Rheinfelden; Peter Hindermann, Bottmingen, all of Switzerland

[73] Assignee: Ciba-Geigy AG, Basel, Switzerland

[22] Filed: Feb. 5, 1973

[21] Appl. No.: 329,516

[30] Foreign Application Priority Data
Feb. 7, 1972  Switzerland.......................... 1737/72

[52] U.S. Cl.............................. 260/372, 8/39, 8/40, 260/247.1 A, 260/247.2 R, 260/249, 260/256.4 Q, 260/256.5 R, 260/262, 260/303, 260/307.5, 260/371, 260/373, 260/377
[51] Int. Cl.............................. C09b 1/30, C09b 1/40
[58] Field of Search............ 260/372, 377, 371, 373

[56] References Cited
UNITED STATES PATENTS
3,462,463    8/1969    Schwander et al. ............... 260/372

*Primary Examiner*—Lorraine A. Weinberger
*Assistant Examiner*—E. Jane Skelly
*Attorney, Agent, or Firm*—Joseph G. Kolodny; Edward McC. Roberts; Prabodh I. Almaula

[57] ABSTRACT

Anthraquinone compounds of the formula

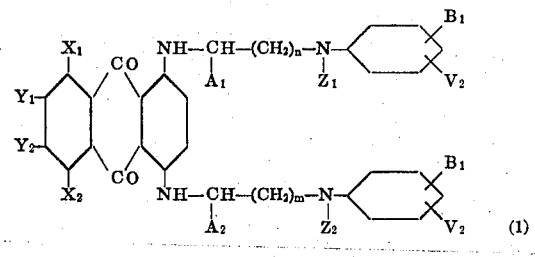

wherein $X_1$ and $X_2$ each represents a hydrogen atom or a hydroxy group, $Y_1$ and $Y_2$ each represents a hydrogen or halogen atom or a sulphonic acid group, $A_1$ and $A_2$ each represents an n-alkyl radical with 1 to 3 carbon atoms or represents a hydrogen atom, $B_1$ $B_2$ each represents a sulphonic acid or carboxy radical, $Z_1$ and $Z_2$ each represents a fiber-reactive acyl radical, $V_1$ $V_2$ each represents a hydrogen atom or an alkyl or alkoxy radical, and n and m is each independently 1 or 2 are excellent dyes and are suitable for dyeing and printing materials of the most diverse kind.

9 Claims, No Drawings

ANTHRAQUINONE COMPOUNDS

The invention relates to anthraquinone compounds of the formula

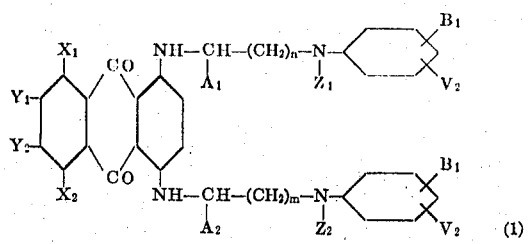

wherein $X_1$ and $X_2$ each represents a hydrogen atom or a hydroxy group, $Y_1$ and $Y_2$ each represents a hydrogen or halogen atom or a sulphonic acid group, $A_1$ and $A_2$ each represents an n-alkyl radical with 1 to 3 carbon atoms or represents a hydrogen atom, $B_1$ and $B_2$ each represents a sulphonic acid or carboxy group, $Z_1$ and $Z_2$ each represents a fiber-reactive acyl radical, $V_1$ and $V_2$ each represents a fiber-reactive acyl radical, $V_1$ and $V_2$ each represents a hydrogen or halogen atom or an alkyl or alkoxy radical, and n and m each independently represents 1 or 2.

If $X_1$ in formula (1) represents a hydroxy group, then $Y_1$ and $Y_2$ is each preferably a hydrogen atom and $X_2$ is also a hydroxy group. Possible halogen atoms represented by $Y_1$ and $Y_2$ are especially chlorine or bromine atoms.

Preferred compounds are those of the formula (1), wherein $X_1$, $X_2$, $Y_1$ and $Y_2$ represent hydrogen atoms. The alkyl radicals $A_1$ and $A_2$ are preferably pure hydrocarbon radicals. Preferred compounds are those of the formula (1) wherein $A_1$ and $A_2$ represent similar alkyl radicals, i.e. wherein both alkyl radicals are of equal length and n and m are the same, i.e. wherein also both alkylene chains contain the same number of carbon atoms. Also possible, however, are compounds with dissimilar radicals $A_1$ and $A_2$ wherein n and m are not the same, i.e. compounds with alkylene and side-chains of different length within a molecule. The total number of carbon atoms in the alkylene chain between the two amino groups, including the side-chain $A_1$ and $A_2$ bonded to the alkylene chain, is six. Particularly valuable compounds of the formula (1) are those in which $A_1$ and $A_2$ represent the methyl radical and n and m are 2, and wherein therefore 1-methylpropylene chains are present.

The substituents $B_1$ and $B_2$ are preferably sulphonic acid groups. In the same way as the alkylene radicals and the side-chains bonded thereto, the acyl fiber-reactive radicals $Z_1$ and $Z_2$ can also be the same or different. Preferably $Z_1$ and $Z_2$ are similar radicals.

By fiber-reactive radicals are meant those radicals which are capable of reacting with the hydroxyl groups of cellulose or with the amino groups of polyamides to form a covalent chemical bond.

Such a radical is, in particular, a low molecular alkanoyl or alkylsulphonyl radical which is substituted by a removable atom or a removable group, a low molecular alkenoyl or alkenesulphonyl radical which is optionally substituted by a removable atom or a removable group, a carbocyclic or heterocyclic radical, containing 4-, 5- or 6-membered rings, which is bonded through a carbonyl or sulphonyl group and is substituted by a removable atom or a removable group, or a triazine or pyrimidine radical which is directly bonded through a carbon atom and is substituted by a removable atom or removable group, or contains such a radical.

Preferably $Z_1$ and $Z_2$ each represents a halogenated aliphatic acyl radical with 2 or 3 carbon atoms, in particular a chloroacetyl, $\alpha,\beta$-dibromopropionyl or $\alpha$-bromacrylyl radical.

Possible substituents $V_1$ and $V_2$ at the two phenyl radicals are e.g. halogen atoms, such as chlorine or bromine atoms, and low molecular alkyl or alkoxy groups, such as the methyl, ethyl, propyl, isopropyl, butyl, methoxy, ethoxy or isopropyloxy group. Anthraquinone compounds of the formula (1) are preferred, wherein $A_1$ and $A_2$, $B_1$ and $B_2$, $V_1$ and $V_2$, and $Z_1$ and $Z_2$ represent in each case similar radicals and the two indices n and m are the same.

A preferred embodiment of the anthraquinone compounds of the formula (1) is therefore, for example, the compound of the formula

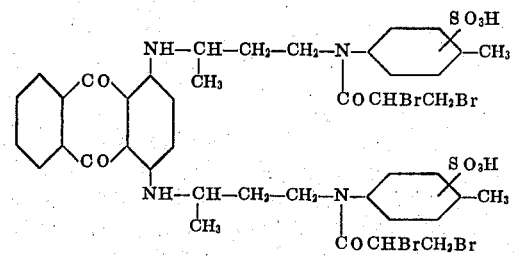

and the compound of the formula

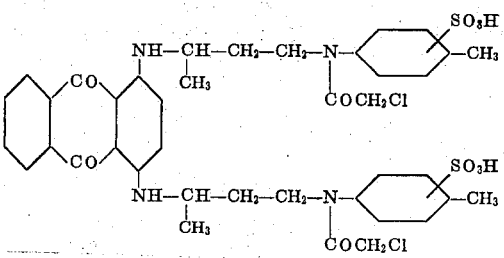

Examples of further possible substituents which can be present in the phenyl radicals of the compounds of the formula (1) are halogen atoms, low molecular alkyl or alkoxy groups etc., and, in particular, acid water-solubilising groups, such as the carboxylic acid and, above all, the sulphonic acid group. A phenyl radical can thus optionally contain more than one sulphonic acid group.

The anthraquinone compounds of the formula (1) are manufactured by sulphonation and acylation.

The process consists in sulphonating (sulphurising) and acylating in known manner anthraquinone compounds of the formula

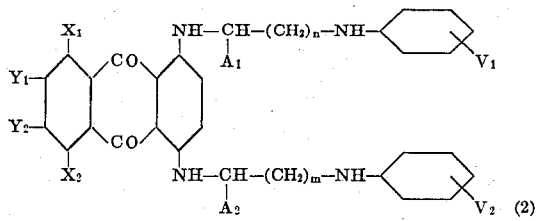

$$\begin{array}{c} X_1 \\ Y_1 \\ Y_2 \\ X_2 \end{array} \begin{array}{c} NH-CH-(CH_2)_n-NH- \\ | \\ A_1 \\ CO \\ CO \\ NH-CH-(CH_2)_m-NH- \\ | \\ A_2 \end{array} \begin{array}{c} V_1 \\ V_2 \end{array} \quad (2)$$

wherein $X_1$, $X_2$, $Y_1$, $Y_2$, $A_1$, $A_2$, $V_1$, $V_2$, n and m have the meanings given in the explanation of the formula (1). The acylation and sulphurisation can be carried out in any desired sequence. Preferably, the acylation is carried out following the sulphonation.

If $B_1$ and $B_2$ in the anthraquinone compounds of the formula (1) are carboxy groups, these must be already present in the starting material used for the acylation.

The position of entry of the sulphonic acid groups is not always the same and remains therefore undefined here.

The starting materials of the formula (2) are obtained in a manner known per se by reacting anthraquinones (or the leuco compounds thereof), which in 1- and 4-position contain one substituent which can be replaced by a phenylaminoalkylamino group, with phenylalkylamines which correspond to the phenylaminoalkylamino radicals bonded in 1- and 4-position in the compounds of the formula (2). Examples of possible replaceable substituents in 1- and 4-position of the anthraquinones are chlorine or bromine atoms, or, in particular, hydroxy groups. The reaction is carried out e.g. in solution, in the melt of the excess phenylaminoalkylamine, or in a solvent which does not participate in the reaction.

Starting materials of the formula (2), which in 1-position and 4-position of the anthraquinone nulceus contain different phenylaminoalkylamino radicals, are obtained by reacting firstly an anthraquinone, which in 1-position and 4-position contains one replaceable substituent, with a phenylaminoalkylamine in the molar ratio 1:1, and subsequently reacting the resulting condensation product with another phenylaminoalkylamine to give the desired compound of the formula (2).

As anthraquinones which contains in 1- and 4-position a replaceable substituent and which are suitable for the manufacture of compounds of the formula (2) there may be cited:

1,4-dichloro-(or 1,4-dibromo-)anthraquinone.
1,4-dihydroxyanthraquinone (quinizarine)
1,4,5,8-tetrahydroxyanthraquinone
1,4,5-trihydroxyanthraquinone
1,4,6-trichloro-(or 1,4,6-tribromo-)anthraquinone
1,4,6,7-tetra-(or 1,4,6,7-tetrabromo-)anthraquinone
1,4-dihydroxy- 6,7-dichloroanthraquinone
1,4-dihydroxy-6,7-dibromo-anthraquinione
1,4-dihydroxy-6-6-chloro-anthraquinone
1,4-dihydroxy-6-bromo-anthraquinone.

Suitable phenylaminoalkylamines for reaction with these anthraquinones are:

1-phenylamino-2-amino-propane,
1-phenylamino-3-amino-butane,
1-(2'-chlorophenylamino)-2-amino-propane,
1-(4'-chlorophenylamino)-2-amino-propane,
1-(2'-methylphenylamino)-2-amino-propane,
1-(4'-methylphenylamino)-2-amino propane,
1-(2', 4'-dimethylphenylamino)-2-amino-propane,
1-(2'-methoxyphenylamino)-2-amino-propane,
1phenylamino-2-amino-butane,
1-(2'-methylphenylamino)-3-amino-butane,
1-(4'-methylphenylamino)-3-amino-butane,
1-(2', 4'-dimethylphenylamino)-3-amino-butane,
1-(2'-chlorophenylamino)-3-amino-butane,
1-(4'-chlorophenylamino)-3-amino-butane,
1-(2'-methoxyphenylamino)-3-amino-butane,
1-phenylamino-3-amino-pentane,
1-(3'-chlorophenylamino)-2-amino-propane,
1-(4'-chlorophenylamino)-2-amino-butane,
1-(3'-chlorophenylamino)-3-amino-butane,
1-(2', 5'-dimethylphenylamino)-3-amino-butane,
1-(2'-chlorophenylamino)-3-amino-pentane,
1-(4'-chlorophenylamino)-3-amino-pentane,
1-(4'-carboxyphenylamino)-3-amino-butane,
1-(2'-carboxyphenylamino)-3-amino-butane.

The phenylaminoalkylamines required for the manufacture of the starting materials of the formula (2) can be manufactured in a manner known per se, for example by condensation of vinylalkyl ketones with aminobenzenes and subsequent aminolysis accompanied by simultaneous reduction.

A modified process for the manufacture of the anthraquinone compounds of the formula (1) consists in using as component for the synthesis of the desired final products a phenylaminoalkylamine which already contains a fiber-reactive acyl radical and a sulphonic acid or carboxy group, and reacting it with a corresponding anthraquinone containing reactive substituents which are able to react with the amine to form a bond, e.g. halogen atoms or hydroxy groups. The phenylaminoalkylamines required for this purpose are obtained by sulphurisation and acylation of an unsubstituted phenylaminoalkylamine in a manner known per se. The reaction and isolation of the reaction products should be carried out under as mild conditions as possible so that halogen atoms which may be bonded to the acyl radical are not split off.

The sulphurisation of the resulting 1,4-diphenylamino-alkylamino-anthraquinone compounds of the formula (2) is performed by conventional methods in concentrated sulphuric acid or in oleum under mild conditions, e.g. at room temperature, or with chlorosulphonic acid in a solvent which does not participate in the reaction.

According to the invention, the compounds of the formula (2) and the corresponding sulphurised compounds are reacted with acylating agents which contain a fiber-reactive radical.

Suitable acylating agents which contain a fiber-reactive radical are in particular the halides or anhydrides of organic acids which contain readily replaceable atoms or groups of atoms.

The following may be cited as examples:
chloroaetyl chloride or bromoacetyl chloride, $\beta$-chloropropionyl chloride or $\beta$-bromopropionyl chloride, $\alpha$, $\beta$-dichloropropionyl chloride or $\alpha$, $\beta$-dibromopropionyl chloride, chloromaleic anhydride, carbyl sulphate, acrylyl chloride, $\beta$-chloroacrylyl chloride or $\beta$-bromoacrylyl chloride, $\alpha$-chloroacrylyl chloride or $\alpha$-bromoacrylyl chloride, $\alpha$, $\beta$-dichloroacrylyl chloride or $\alpha$, $\beta$-dibromoacrylyl chloride, trichloroacrylyl chloride, chlorocrotonyl chloride, propiolic acid chloride, 3,5-dinitro-4-chlorobenzene-sulphonic acid chloride or -carboxylic acid chloride, 3-nitro -4-chlorobenzenesulphonic acid chloride or -carboxylic acid chloride. 2,2,3,3-tetrafluorocyclobutane-1-carboxylic acid chloride, β-chloroethylsulphonylendomethylenecyclohexanecarboxylic acid chloride, acrylylsulphonylendomethylenecyclohexanecarboxylic acid chloride, and above all heterocyclic acid halides and their derivatives, such as the 2-chlorobenzoxazolecarboxylic acid chlorides, 2-chlorobenzthiazolecarboxylic acid chlorides or -sulphonic acid chlorides and above all the following compounds, which possess at least 2 nitrogen atoms as hetero-atoms of a 6-membered structure: 4,5-dichloro-1-phenylpyridazonecarboxylic acid chloride or -sulphonic acid chloride, 4,5-dichloropyridazonepropionic acid chloride, 1,4-dichlorophthalazinecarboxylic acid chloride or -sulphonic acid chloride, 2,3-dichloroquinoxalinecarboxylic acid chloride or -sulphonic acid chloride, 2,4-dichloroquinazolinecarboxylic acid chloride or -sulphonic acid chloride, 2-methanesulphonyl-4-chloro-6-methylpyrimidine, tetrachloropyridazine, 2,4-bis-methanesulphonyl-6-methylpyrimidine, 2,4,6-tri- or 2,4,5,6-tetrachloropyrimidine, 2,4,6-tri- or 2,4,5,6-tetrabromopyrimidine, 2-methanesulphonyl-4,5-dichloro-6-methylpyrimidine, 2,4-dichloropyrimidine-5-sulphonic acid, 5-nitro- or 5-cyano-2,4,6-trichloropyrimidine, 2,6-bis-methanesulphonylpyridine-4-carboxylic acid chloride, 2,4-dichloro-5-chloromethyl-6-methyl-pyrimidine, 2,4-dibromo-5-bromomethyl-6-methyl-pyrimidine, 2,4-dichloro-5-chloromethylpyrimidine, 2,4-dibromo-5-bromomethylpyrimidine, 2,5,6-trichloro-4-methylpyrimidine, 2,6-dichloro-4-trichloromethylpyrimidine or especially 2,4-dimethanesulphonyl-5-chloro-6-methylpyrimidine, 2,4-dichloropyrimidine, 3,6-dichloropyridazine, 3,6-dichloropyridazine-5-carboxylic acid chloride, 2,6-dichloro-or 2,6-dibromo-4-carboethoxypyrimidine, 2,4,5-trichloropyrimidine, 2,4-dichloropyrimidine-6-carboxylic acid chloride, 2,4-dichloropyrimidine-5-carboxylic acid chloride, 2,6-dichloro- or 2,6-dibromopyrimidine-4- or -5-carboxylic acid amide or-sulphonic acid amide or -4- or -5-sulphonic acid chloride, 2,4,5,6-tetrachloropyridazine, 5-bromo-2,4,6-trichloropyrimidine, 5-acetyl-2,4,6-trichloropyrimidine, 5-nitro-6-methyl-2,4-dichloropyrimidine, 2-chlorobenzthiazole-6-carboxylic acid chloride, 5-nitro-6-methyl-2,4-dichloropyrimidine, 2,4,6-trichloro-5-chloropyrimidine, 2,4,5,6-tetrafluoropyrimidine, 4,6-difluoro-5-chloropyrimidine, 2,4,6-trifluoro-5-chloropyrimidine, 2,4,5-trifluoropyrimidine, 2,4,6-trichloro (-tribromo or -trifluoro)-1,3,5-triazines, as well as 4,6-dichloro (dibromo or -difluoro)-1,3,5-triazines which are substituted in the 2-position by an aryl or alkyl radical, for example a phenyl methyl or ethyl radical, or by the radical of an aliphatic or aromatic mercapto compound bonded via the sulphur atom, or hydroxy compound bonded via the oxygen atom, or especially by a NH₂ group or by the radical of an aliphatic, heterocyclic or aromatic amino compound bonded via the nitrogen atom. As such compounds, the radicals of which can be bonded to the triazine nucleus in the 2-position by reaction with trihalogenotriazines, the following may for example be mentioned:

aliphatic or aromatic mercapto compounds or hydroxyl compounds such as thioalcohols, thioglycollic acid, thiophenols, alkoxyalkanols, methyl-, ethyl-, isopropyl alcohol, glycollic acid, phenol, chlorophenols or nitrophenols, phenolcarboxylic and phenolsulphonic acids, naphthols, naphtholsulphonic acids and the like, but expecially ammonia and compounds containing amino groups which can be acylated, such as hydroxylamine, hydrazine, phenylhydrazine, phenylhydrazinesulphonic acids, glycol monoalkyl ethers, methylamine, ethylamine, isopropylamine, methoxyethylamine, methoxypropylamine, dimethylamine, diethylamine, methylphenylamine, ethylenephenylamine, chloroethylamine, ethanolamine, propanolamines, benzylamine, cyclohexylamine, morpholine, piperidine, piperazine, aminocarbonic acid esters, aminoacetic acid ethyl ester, aminoethanesulphonic and N-methylaminoethanesulphonic acid, but above all aromatic amines, such as aniline, N-methylaniline, toluidines, xylidines, chloroanilines, p-and m-aminoacetanilide, aminophenols, anisidine, phenetidine and especially anilines containing acid groups, sulphanilic acid, methanilic acid, orthanilic acid, anilinedisulphonic acid, aminobenzylsulphonic acid, aniline w-methanesulphonic acid, aminobenzenedicarboxylic acids, naphthylaminomonosulphonic, -disulphonic and -trisulphonic acids, aminobenzoic acids, such as 2-hydroxy-5-aminobenzoic acid.

It is also possible to effect the introduction of the substituent in 2-position of the triazine radical after the acylation.

Furthermore, it is also possible to manufacture the α-bromacrylyl derivatives of the formula (1) from the corresponding α,β-dibromopropionyl compounds by dehydrobromination. This dehydrohalogenation is carried out by conventional methods, e.g. by treatment with alkali, preferably at low temperature.

The condensation with the acid halides or anhydrides, or with the heterocyclic compounds, is carried out advantageously in the presence of an acid binding agent, e.g. sodium carbonate or sodium hydroxide, and under such conditions that an unsaturated bond, or a replaceable halogen atom, still remains in the final product, i.e. in organic solvents or at relatively low temperatures.

The compounds of the formula (1) obtained by the present process and modifications thereof are new. They are excellent dyes and are suitable for dyeing and printing materials of the most diverse kind, e.g. those of animal origin, such as leather, silk and, above all, wool, as well as various synthetic fibres, e.g. of superpolyamides and superpolyurethanes. They are particularly suitable for dyeing from neutral to acid medium. The dyeings thus obtained on wool have excellent fastness to light, milling, perspiration and washing.

The new dyes are also suitable for dyeing and printing cellulosic materials, such as cotton and regenerated cellulose fibres, whereby they are subjected to a heat treatment in the presence of alkali, e.g. in the presence of sodium (hydrogen) carbonate, sodium hydroxide or trisodium phosphate, in the order to fix the dyes.

In particular, they are suitable for dyeing wool from a slightly acid, e.g. acetic acid, bath in the presence of wetting and levelling agents, in particular in the presence of polyglycol ether derivatives which contain on average 5 to 10 —$CH_2$—$CH_2$—O groups and are derived from primary monoamines which contain an aliphatic hydrocarbon radical with 15 to 20 carbon atoms. The dyeings thus obtained are distinguished by good wet fastness properties and good levelness characteristics, it being possible to additionally improve the wet fastness properties of the dyeings by increasing the pH the dyebath to a slightly alkaline, e.g. ammonical, reaction at the conclusion of the dyeing process. Chlorinated wool can be advantageously dyed by such a process chiefly with the aim of reducing felting and shrinking as well as increasing the affinity to the dyes.

The following Examples illustrate the invention, the parts and percentages being by weight unless otherwise stated.

EXAMPLE 1

A suspension of 24.2 parts of leucoquinizarine in 90 parts of n-butanol is heated to 100°C in a nitrogen atmosphere. After the addition of 65.6 parts of the amine of the formula

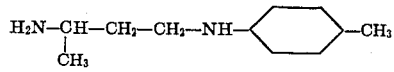

(manufactured by condensation of vinylmethyl ketone with p-toluidine and subsequent aminolysis with simultaneous reduction) the mixture is stirred for 6 hours, then 24 parts of quinizarine are added and stirring is continued for 10 to 20 hours in a nitrogen atmosphere until the starting materials have disappeared.

Then oxidation is effected in an open reaction vessel for about 10 hours at 100°C whle passing in air. Upon completion of the oxidation, 360 parts of methanol are passed in and stirring is continued at 60° to 65°C until the onset of crystallisation. The batch is cooled to 25°C, filtered, and the filter product is washed firstly with a mixture of butanol/methanol and finally with methanol alone and dried at 60°C in vacuo. About 80 parts of a bluish black powder having a slightly bronzy appearance are obtained.

28 parts of the crude condensation product are added at 23° to 25°C to 275 parts of oleum (12.5% content of $SO_3$) and the mixture is stirred until complete sulphurisation has taken place. After 4 to 10 hours, the sulphurisation mixture is poured on 1200 parts of an ice/sodium chloride mixture while stirring, stirred until homogeneous and filtered. The residue is suspended in 400 parts of water, the suspension is neutralised with dilute sodium hydroxide solution, and the product is salted out by addition of about 100 parts of sodium chloride and filtered. It is dried in vacuo at 55° to 60°C to give about 38 parts of a reddish blue powder which is readily soluble in water.

14.4 parts of the sulphurised product are dissolved at 60°C in 500 parts of water and the solution is cooled to 8° to 10°C. While stirring vigorously, 12.5 parts of $\alpha,\beta$-dibromopropionyl chloride and simultaneously dilute sodium hydroxide solution are added dropwise in such a manner that the pH of the reaction solution remains constantly between 5 and 6. Upon completion of the acylation, the dye is precipitated by addition of about 25 parts of sodium chloride, filtered off and dried. It is obtained as a reddish blue powder. The dye of the formula

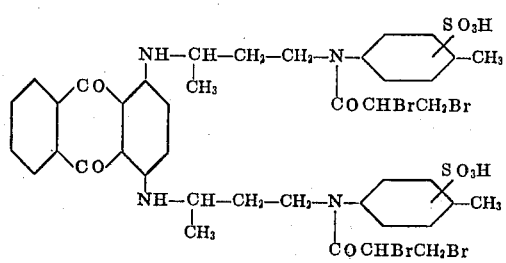

manufactured in this way dissolves in water with a blue and in sulphuric acid with brownish colour and dyes wool from a slightly acid bath, optionally with the addition of the assistants conventionally employed for producing reactive dyeings, in pure, bluish shades having excellent fastness properties.

Further dyes which dye wool or polyamide in pure, blue shades with similarly good fastness properties are obtained if, as described hereinabove, leucoquinizarine is condensed with 1-p-toluylamino-3-amino-butane and the condensation product is subsequently sulphurised, except that instead of the $\alpha,\beta$-dibromopropionyl radical, the chloroacetyl, 3-nitrobenzoyl, 3-nitro-6-methylphenyl-sulphonyl, dichlorobenzoyl, $\beta$-chloropropionyl, $\beta$-chlorocrotonyl, acrylyl, cyclohexylcarbonyl, 2,4,5-trichlorobenzoyl-acetyl, 3,4-dichlorophenylsulphonyl or 2,4-dichlorobenzoyl radical is introduced at the amino groups bonded to the sulphophenyl radicals.

Dyes which yield dyeings with good fastness properties particularly on cotton are obtained if in the same way the 2,4-dichloro-1,3,5-triazinyl-(6),2,4-dibromo-1,3,5-triazinyl-(6), 2-amino-4-chloro-1,3,5-triazinyl-(6), 2-anilino-4-chloro-1,3,5-triazinyl-(6), 2-methoxy-4-chloro-1,3,5-triazinyl-(6), 2-ethoxy-4-chloro-1,3,5-triazinyl-(6), 2-isopropoxy-4-chloro-1,3,5-triazinyl-(6), 2-$\beta$-ethoxyethoxy-4-chloro-1,3,5-triazinyl-(6) or the 2-chloro-4-(3'-sulphophenylamino)-1,3,5-triazinyl-(6) radical is introduced into the molecule as reactive radical.

A dyeing with good fastness properties is also obtained by introducing the 3-aminosulphonylbenzoyl radical instead of the $\alpha,\beta$-dibrompropionyl radical into the dye molecule and dyeing cellulose with the resulting compound in the presence of a polyfunctional fixing component, e.g. 2,4,6-triacrylhexahydro-1,3,5-triazine.

EXAMPLE 2

According to the method described in Example 1, leucoquinizarine is condensed with 1-p-toluyl-amino-2-amino-butane and the condensation product is sulphurised. The resulting sulphurised compound is acylated with 2,4-dichloro-benzoyl chloride to give the dye of the fromula

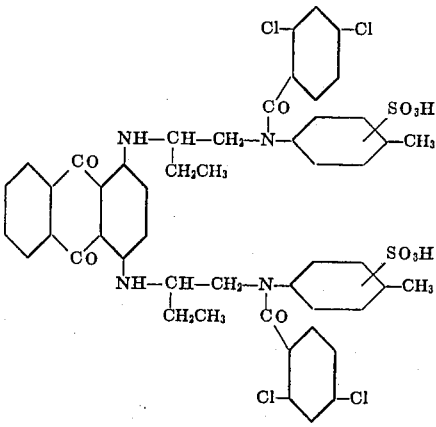

which dyes wool and polyamide in blue shades having good fastness properties.

Blue dyes which produce dyeings with good fastness properties are also obtained by using as acylating agent 1,4-dichlorophthalazine-6-carboxylic acid chloride, 2,-3-dichloroquinoxaline-6-carboxylic acid chloride, 2- methanesulphonyl 4,5-dichloro-6-methylpyrimidine, 2,4,5,6-tetrachloropyrimidine, 2,4,5-trichloropyrimidine, 2,6-dichloropyrimidine-5-carboxylic acid chloride or 2,4,6-trifluoro-5-chloropyrimidine instead of 2,4-dichlorobenzoyl chloride.

Further dyes with similar properties are obtained by condensing 1-(4'-chlorophenylamino)-2-aminopropane or 1-(2'-methoxyphenylamino)-3-aminobutane with 1,4,5,8-tetrahydroxy-anthraquinone, 1,4-dihydroxy-6-chloro-anthraquinone or 1,4-dihydroxy-6,7-dichloro-anthraquinone, sulphurising the condensation product and acylating with chloroacetyl chloride or $\alpha,\beta$-dichloropropionyl chloride.

DYEING INSTRUCTION 1.5 parts of the dye which can be obtained according to Example 1 is dissolved in 4000 parts of water and parts of ammonium sulphate, 5 parts of crystallised sodium sulphate, 1 part of 80% acetic acid and 1 part of the adduct of oleylamine and ethylene oxide (the manufacture of which is described hereinbelow) are added. Thoroughly wetted chlorinated wool (100 parts) is put into this dyebath at 30°C.

The dyebath is brought to the boil in the course of 30 minutes and dyeing is carried out for 50 minutes at the boil. The bath is then cooled to 80°C and adjusted to pH 8.5 by addition of ammonia. The wool is dyed in this bath for a further 15 minutes. Finally it is rinsed with cold water and dried. The wool is dyed in brilliant blue shades which are fast to washing and of good fastness to light.

MANUFACTURE OF THE ETHYLENE OXIDE ADDUCT 100 parts of industrial oleylamine are treated with 1 part of finely divided sodium and the mixture is heated to 140°C, whereupon ethylene oxide is passed in at 135°C to 140°C. As such as the ethylene oxide has been quickly taken up, the reaction temperature is lowered to 120°–125°C and the passing in of ethylene oxide is continued until 133 parts thereof have been taken up. The reaction product obtained in this manner dissolves in water to give a practically clear solution.

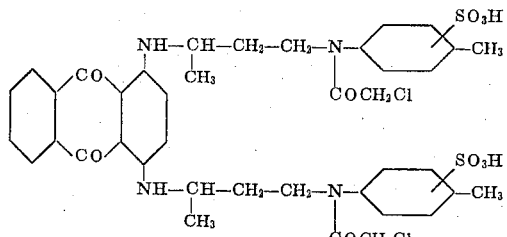

What is claimed is:

1. Anthraquinone compounds of the formula

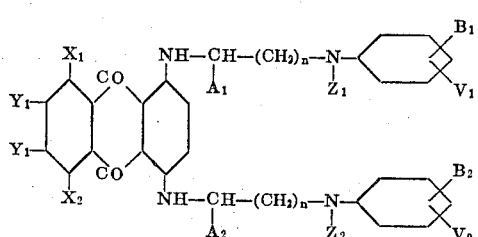

wherein $X_1$ and $X_2$ each represents a hydrogen atom or a hydroxy group, $Y_1$ and $Y_2$ each represents a hydrogen or halogen atom or a sulphonic acid group, $A_1$ and $A_2$ each represents an n-alkyl radical with 1 to 3 carbon atoms or represents a hydrogen atom, $B_1$ and $B_2$ each represents a sulphonic acid or carboxy radical, $Z_1$ and $Z_2$ each represents low molecular alkanoyl or alkyl sulphonyl radical substituted by a removable chlorine or bromine atom, a low molecular alkenoyl or alkenesulphonyl radical optionally substituted by a removable chlorine or bromine atom, a 4-,5- or 6-membered carbocyclic radical bonded through a carbonyl or sulphonyl group and is substituted by a removable chlorine or bromine atom, $V_1$ and $V_2$ each represents a hydrogen or halogen atom or a lower alkyl or lower alkoxy radical, an n and m is each independently 1 or 2.

2. Anthraquinone compounds according to claim 1 wherein $B_1$ and $B_2$ represent sulphonic acid groups.

3. Anthraquinone compounds according to claim 1 wherein $X_1$, $X_2$, $Y_1$ and $Y_2$ represent hydrogen atoms.

4. Anthraquinone compounds according to claim 1, wherein $A_1$ and $A_2$, $B_1$ and $B_2$, $V_1$ and $V_2$ and $Z_1$ and $Z_2$ in each case have the meaning defined in claim 1 and n and m are equal numbers.

5. Anthraquinone compounds according to claim 1 wherein $A_1$ and $A_2$ represent the methyl radical and n and m are 2.

6. Anthraquinone compounds according to claim 1 wherein $Z_1$ and $Z_2$ each represents a fiber-reactive, halogenated aliphatic acyl radical of a monocarboxylic acid with 2 to 3 carbon atoms.

7. Anthraquinone compounds according to claim 1 wherein $Z_1$ and $Z_2$ each represents a chloroacetyl, $\alpha,\beta$-dibromopropionyl or $\alpha$-bromacrylyl radical.

8. The anthraquinone compound according to claim 1, of the formula

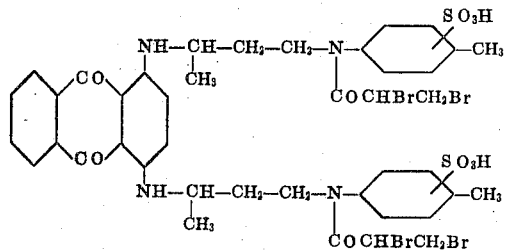

9. The anthraquinone compound according to claim 1, of the formula